(12) United States Patent
Oguro et al.

(10) Patent No.: US 11,362,362 B2
(45) Date of Patent: Jun. 14, 2022

(54) FUEL CELL APPARATUS

(71) Applicants: DAINICHI CO., LTD., Niigata (JP); KYOCERA CORPORATION, Kyoto (JP)

(72) Inventors: Hiroki Oguro, Niigata (JP); Shintaro Yanagiuchi, Niigata (JP); Tomohiro Fukagawa, Niigata (JP); Kentaro Tanaka, Niigata (JP); Takashi Ono, Kirishima (JP)

(73) Assignees: DAINICHI CO., LTD., Niigata (JP); KYOCERA Corporation, Kyoto (JP)

( * ) Notice: Subject to any disclaimer, the term of this patent is extended or adjusted under 35 U.S.C. 154(b) by 128 days.

(21) Appl. No.: 16/322,134

(22) PCT Filed: Aug. 1, 2017

(86) PCT No.: PCT/JP2017/027947
§ 371 (c)(1),
(2) Date: Jan. 31, 2019

(87) PCT Pub. No.: WO2018/025881
PCT Pub. Date: Feb. 8, 2018

(65) Prior Publication Data
US 2019/0173118 A1  Jun. 6, 2019

(30) Foreign Application Priority Data

Aug. 2, 2016 (JP) .............................. JP2016-152323
Apr. 25, 2017 (JP) .............................. JP2017-086070

(51) Int. Cl.
*H01M 8/2475* (2016.01)
*H01M 8/0606* (2016.01)
(Continued)

(52) U.S. Cl.
CPC .......... *H01M 8/2475* (2013.01); *H01M 8/00* (2013.01); *H01M 8/04* (2013.01);
(Continued)

(58) Field of Classification Search
CPC ........ H01M 8/2475; H01M 8/04; H01M 8/00; H01M 8/04052; H01M 8/04089;
(Continued)

(56) References Cited

U.S. PATENT DOCUMENTS 9,227,781 B1 * 1/2016 Daniel ..................... H01M 8/20
2005/0058880 A1 * 3/2005 Fujita ................... H01M 8/1011
429/410

(Continued)

FOREIGN PATENT DOCUMENTS

CN 1921203 A 2/2007
JP 2002175820 A 6/2002
(Continued)

OTHER PUBLICATIONS

Knight et al.: "Chapter 8 : Lecture Presentation Chapter 8 Equilibrium and Elasticity", Jan. 1, 2015, 1-95 pages, Lecture Presentation, Pearson Education.

*Primary Examiner* — Stewart A Fraser
(74) *Attorney, Agent, or Firm* — Viering, Jentschura & Partner mbB

(57) ABSTRACT

The disclosure relates to a fuel cell apparatus in which a stable installation state may be maintained even when a size thereof is reduced. A fuel cell apparatus according to the present disclosure may include a fuel cell module including fuel cells housed in a housing; a plurality of auxiliary machines which operate the fuel cell module; and an exterior case, shaped in a rectangular prism, which houses the fuel cell module and the auxiliary machines. A gravity center of
(Continued)

the fuel cell apparatus may be located below a level equal to half a height of the exterior case.

9 Claims, 8 Drawing Sheets

(51) Int. Cl.
*H01M 8/04* (2016.01)
*H01M 8/00* (2016.01)
*H01M 8/04089* (2016.01)
*H01M 8/04007* (2016.01)

(52) U.S. Cl.
CPC ... *H01M 8/04052* (2013.01); *H01M 8/04089* (2013.01); *H01M 8/0606* (2013.01)

(58) Field of Classification Search
CPC .............. H01M 8/0606; H01M 8/0687; H01M 8/04014; H01M 8/0625
See application file for complete search history.

(56) References Cited

U.S. PATENT DOCUMENTS

| | | | |
|---|---|---|---|
| 2006/0088751 A1* | 4/2006 | Stefener | H01M 8/00 429/428 |
| 2007/0042248 A1* | 2/2007 | Kim | H01M 8/04029 429/437 |
| 2017/0162892 A1* | 6/2017 | Morita | H01M 8/04029 |

FOREIGN PATENT DOCUMENTS

| | | |
|---|---|---|
| JP | 2003214712 A | 7/2003 |
| JP | 2006090605 A | 4/2006 |
| JP | 2007294296 A | 11/2007 |
| JP | 2009277612 A | 11/2009 |
| JP | 2010062134 A | 3/2010 |
| JP | 2015115305 A | 6/2015 |
| JP | 2015191712 A | 11/2015 |
| JP | 2016046224 A | 4/2016 |
| WO | 2014136553 A1 | 9/2014 |
| WO | WO-2014136553 A1 * | 9/2014 .......... H01M 8/2475 |

* cited by examiner

FUEL CELL APPARATUS

CROSS-REFERENCE TO RELATED APPLICATIONS

This application is a national stage entry according to 35 U.S.C. 371 of PCT Application No. PCT/JP2017/027947 filed on Aug. 1, 2017, which claims priority to Japanese Application Nos. 2016-152323 filed on Aug. 2, 2016, and 2017-086070 filed on Apr. 25, 2017, which are entirely incorporated herein by reference.

TECHNICAL FIELD

The present disclosure relates to a fuel cell apparatus.

BACKGROUND

In recent years, as next-generation energy sources, there have been proposed various fuel cell apparatuses of the type which includes a fuel cell module and auxiliary machines for operating the fuel cell module accommodated in an exterior case, the fuel cell module being constructed by housing, in a housing, a cell stack device including fuel cells capable of providing electric power by utilizing a fuel gas (hydrogen-containing gas) and air (oxygen-containing gas).

Japanese Unexamined Patent Publication JP-A 2010-62134 (Patent Literature 1) discusses a fuel cell system provided at a lower part thereof with a relatively voluminous and heavyweight oxidant gas supply device.

SUMMARY

A fuel cell apparatus according to a non-limiting aspect of the present disclosure may include: a fuel cell module including fuel cells housed in a housing; a plurality of auxiliary machines which operate the fuel cell module; and an exterior case, shaped as a rectangular prism, which houses the fuel cell module and the auxiliary machines. A gravity center of the fuel cell apparatus is located below a level equal to half a height of the exterior case.

DETAILED DESCRIPTION

For example, in the design of a fuel cell apparatus intended for home use or small retail shops, downsizing may be regarded as a matter of importance. A smaller version of a fuel cell apparatus cannot be developed without low-profile styling or a reduction in footprint, or both of low-profile styling and footprint reduction. However, in the making of a low-profile fuel cell apparatus, a reduction in its footprint may lead to poor stability of installation of the fuel cell apparatus. Especially in seismic disaster situations, such a fuel cell apparatus may be caused to topple down.

To suppress toppling of the fuel cell apparatus, the fuel cell apparatus needs a step beyond disposing a relatively voluminous and heavyweight constituent component toward the bottom thereof, that is; the fuel cell apparatus needs attainment of proper weight balance in its entirety as a key factor. The fuel cell apparatus made of well-balanced weight is resistant to toppling, and can be maintained in a stable installation state even when a size thereof is reduced. The following describes the details of a fuel cell apparatus according to the present disclosure.

According to a non-limiting aspect of the present disclosure, a fuel cell apparatus is constructed by housing, in an exterior case in the form of a rectangular prism, a fuel cell module including fuel cells housed in a housing, and a plurality of auxiliary machines which operate the fuel cell module. On an as needed basis, extra devices other than the fuel cell module and the auxiliary machines may be housed in the exterior case.

Figure 1A:
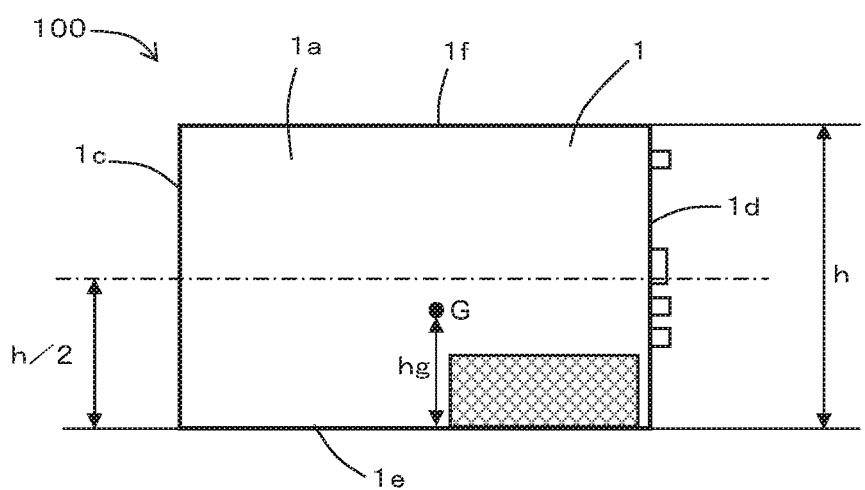
FIG. 1A is a front view showing an example of a fuel cell apparatus according to a non-limiting aspect of the present disclosure.
Figure 1B:
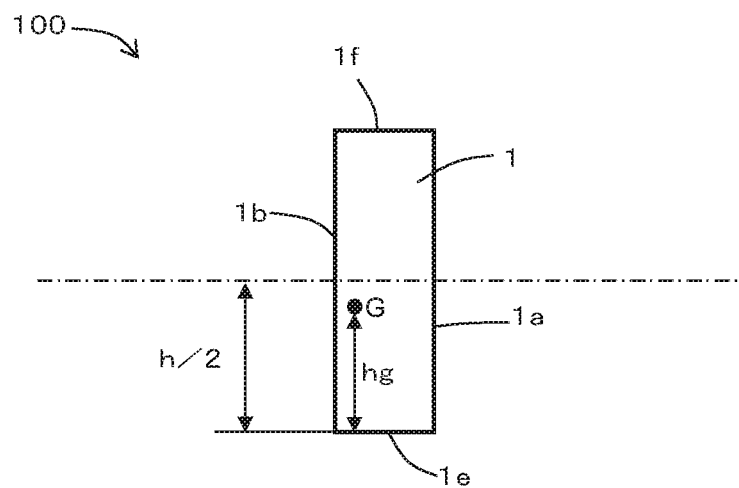
FIG. 1B is a left-hand side view showing the example of the fuel cell apparatus according to a non-limiting aspect of the present disclosure.
Figure 1C:
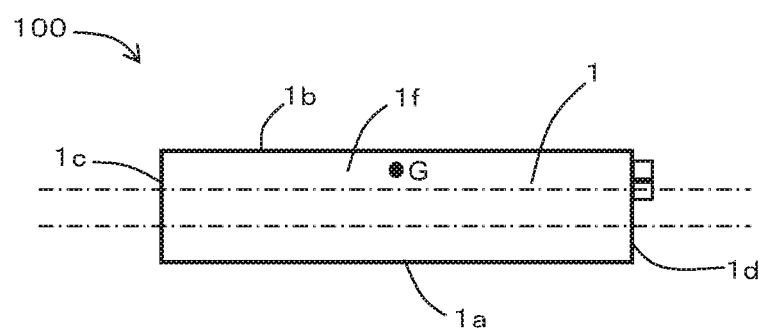
FIG. 1C is a plan view showing the example of the fuel cell apparatus according to a non-limiting aspect of the present disclosure.
Figure 2A:
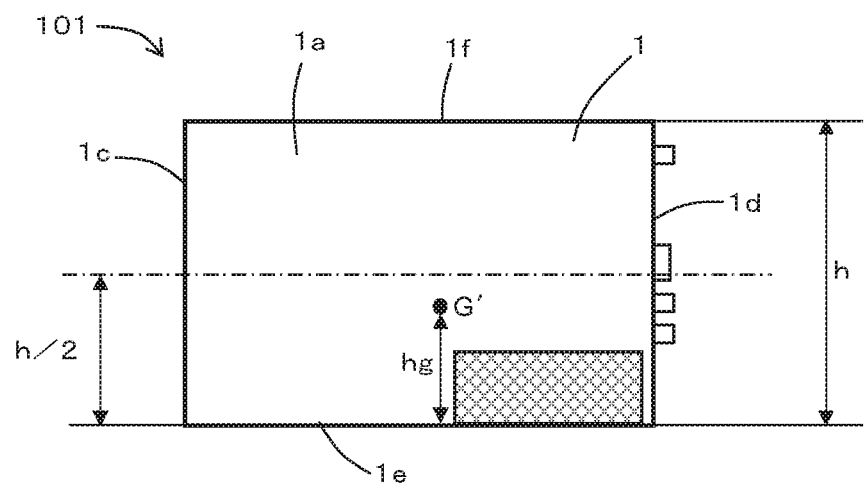
FIG. 2A is a front view showing a modified example of the fuel cell apparatus according to a non-limiting aspect of the present disclosure.
Figure 2B:
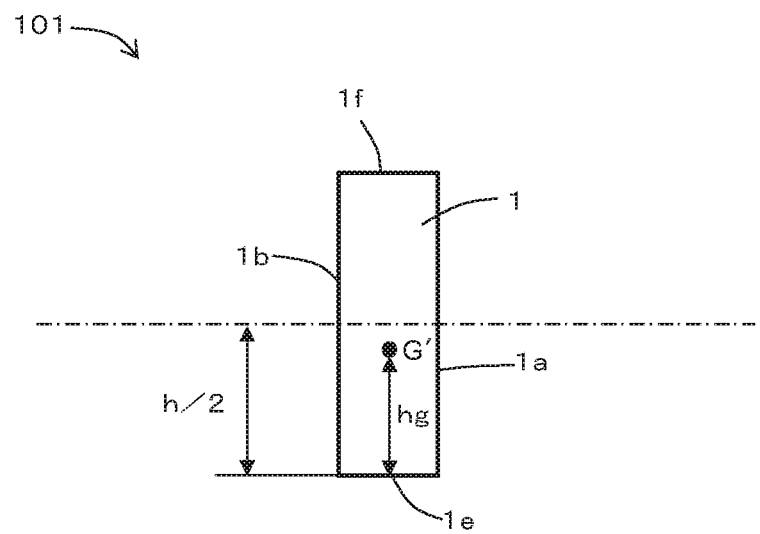
FIG. 2B is a left-hand side view showing the modified example of the fuel cell apparatus according to a non-limiting aspect of the present disclosure.
Figure 2C:
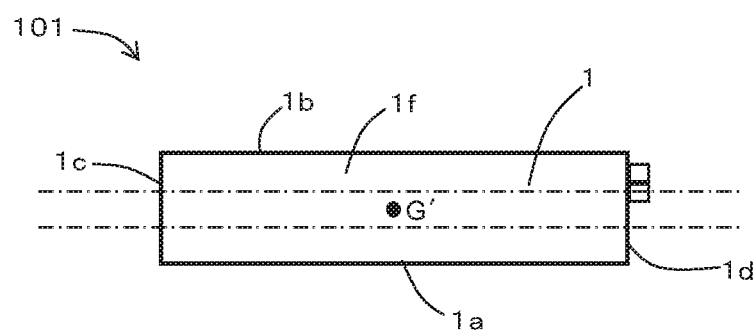
FIG. 2C is a plan view showing the modified example of the fuel cell apparatus according to a non-limiting aspect of the present disclosure.
Figure 3A:
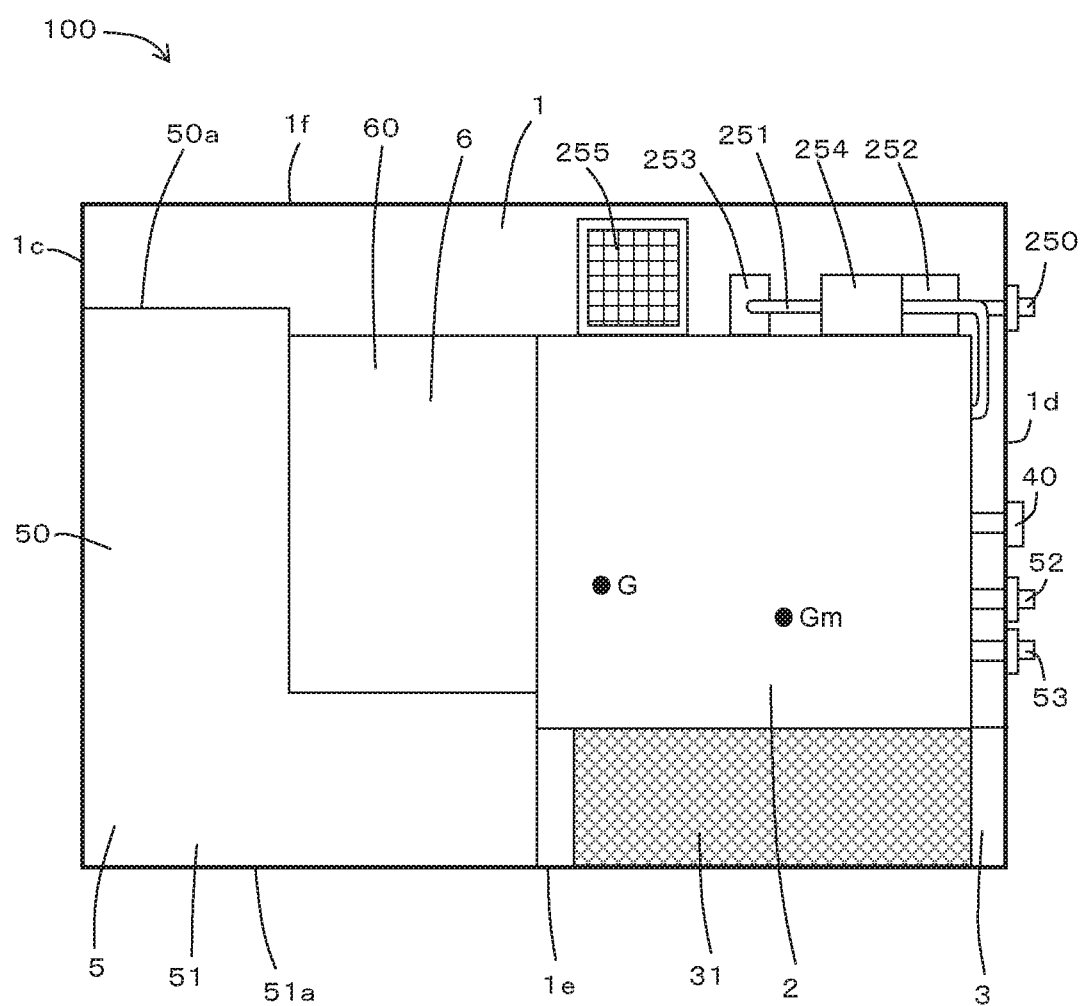
FIG. 3A is a front view of the fuel cell apparatus shown in FIG. 1, illustrating an interior of the apparatus transparently.
Figure 3B:
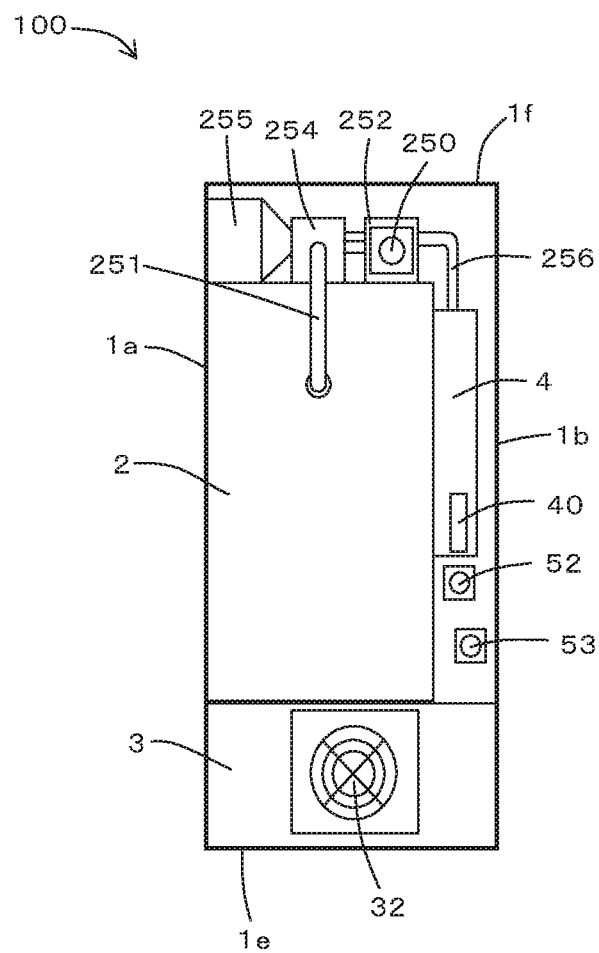
FIG. 3B is a right-hand side view of the fuel cell apparatus shown in FIG. 1, illustrating the interior of the apparatus transparently.
Figure 3C:
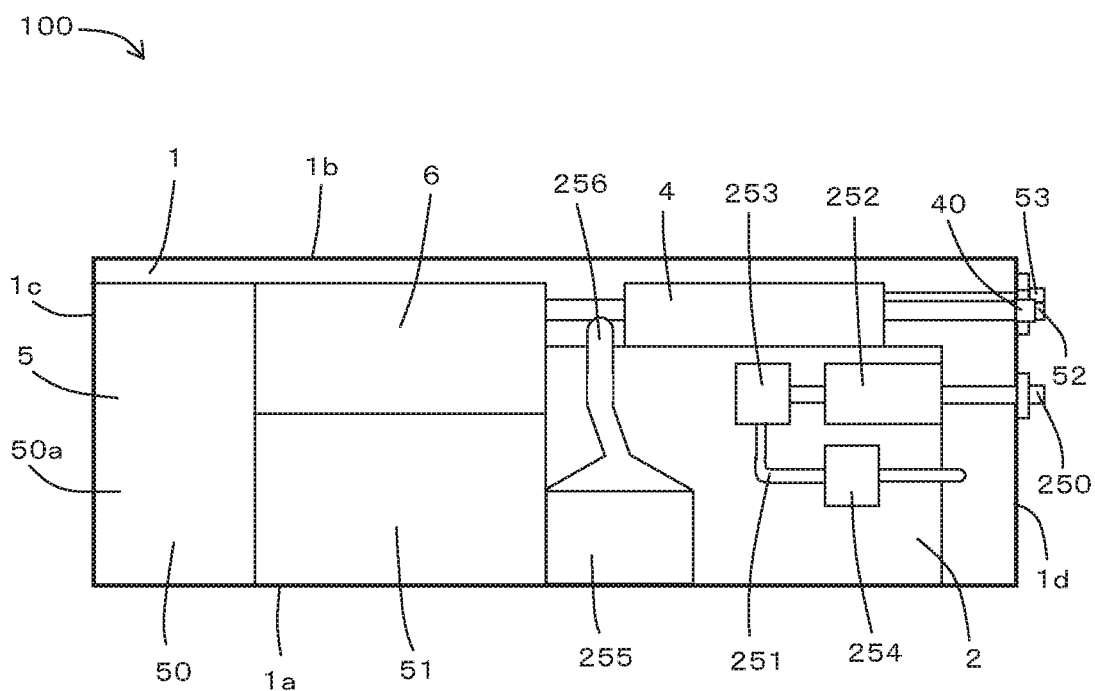
FIG. 3C is a plan view of the fuel cell apparatus shown in FIG. 1, illustrating the interior of the apparatus transparently.
Figure 4:
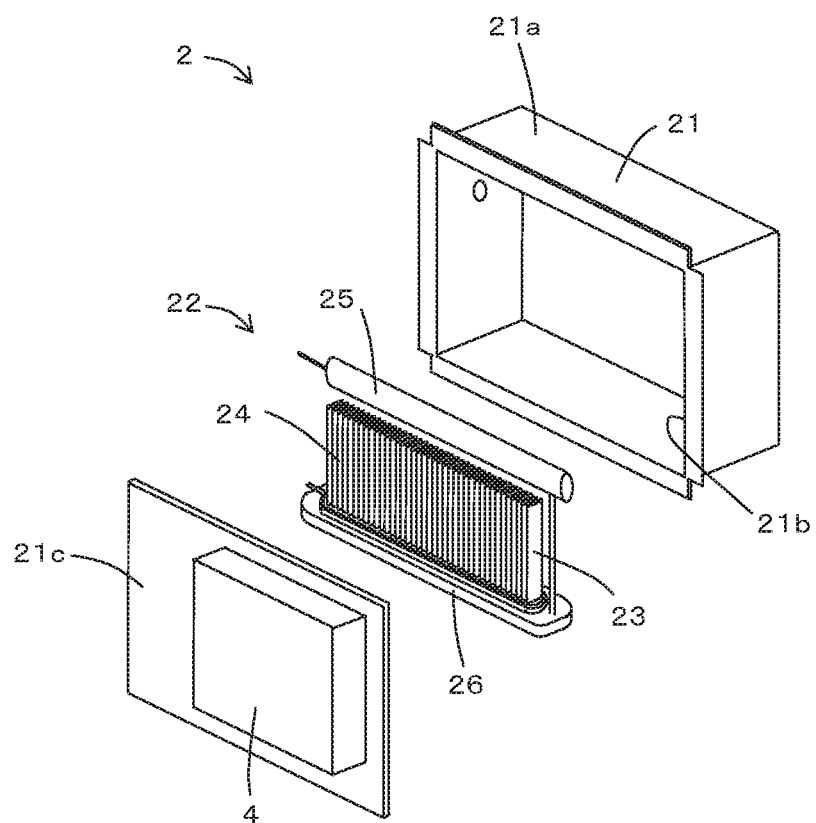
FIG. 4 is an exploded perspective view showing an example of a fuel cell module according to a non-limiting aspect of the present disclosure.
Figure 5:
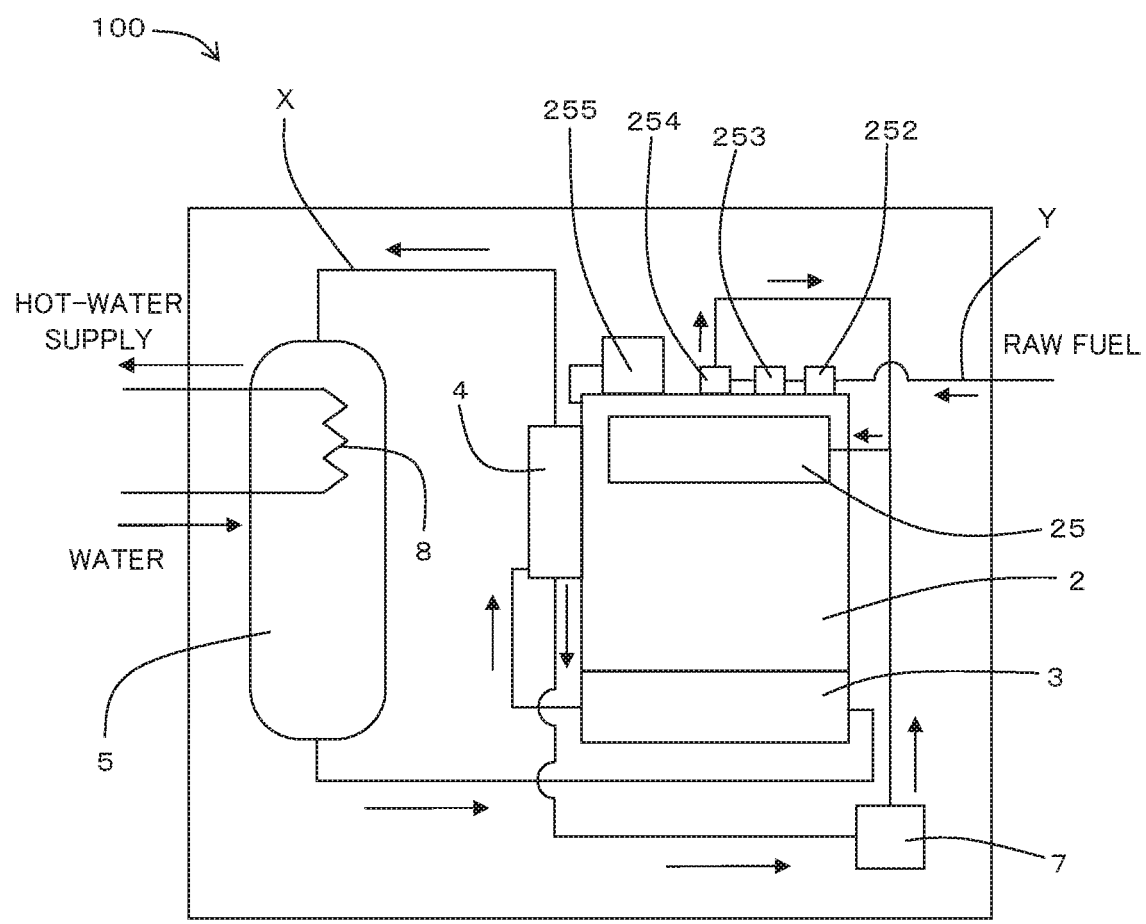
FIG. 5 is a block diagram showing an example of the structure of the fuel cell apparatus shown in FIGS. 1 to 3.

The following describes the fuel cell apparatus according to a non-limiting aspect of the present disclosure with reference to FIGS. 1 to 5. FIG. 1A is a front view showing an example of a fuel cell apparatus 100 according to a non-limiting aspect of the present disclosure. FIG. 1B is a left-hand side view showing the example of the fuel cell apparatus 100 according to a non-limiting aspect of the present disclosure. FIG. 1C is a plan view showing the example of the fuel cell apparatus 100 according to a non-limiting aspect of the present disclosure. FIG. 2 is an external view showing a modified example of a fuel cell apparatus 101 according to a non-limiting aspect of the present disclosure, in which FIG. 2A is a front view showing the modified example of the fuel cell apparatus 101 according to a non-limiting aspect of the present disclosure, FIG. 2B is a left-hand side view showing the modified example of the fuel cell apparatus 101 according to a non-limiting aspect of the present disclosure, and FIG. 2C is a plan view showing the modified example of the fuel cell apparatus 101 according to a non-limiting aspect of the present disclosure. FIG. 3A is a front view of the fuel cell apparatus 100, illustrating the interior of the apparatus transparently. FIG. 3B is a right-hand side view of the fuel cell apparatus 100, illustrating the interior of the apparatus transparently. FIG. 3C is a plan view of the fuel cell apparatus 100, illustrating the interior of the apparatus transparently. FIG. 4 is an exploded perspective view showing an example of a fuel cell module. FIG. 5 is a block diagram showing an example of the structure of the fuel cell apparatus shown in FIGS. 1 to 3.

In the fuel cell apparatus 100 according to a non-limiting aspect of the present disclosure, an exterior case 1 is shaped in a rectangular prism having six surfaces, of which four surfaces composed of a pair of largest-area surfaces and other pair of surfaces, each disposed contiguous with both a short side of one of the largest-area surfaces and a short side of the other, define side faces, and, a remaining pair of surfaces defines a bottom face and a top face. In the following description, for purposes of convenience, of the four surfaces defining the side faces, the pair of largest-area surfaces will be referred to as a front face 1a and a back face 1b, and the pair of surfaces which is disposed contiguous with the short sides of the largest-area surfaces will be referred to as a left side face 1c and a right side face 1d, but it is understood that such a designation is not intended to be limiting of the orientation, mounting condition, etc. of the fuel cell apparatus 100. The bottom face 1e and the top face 1f correspond to the bottom and the top of the fuel cell apparatus in installed condition.

In the fuel cell apparatus 100 according to a non-limiting aspect of the present disclosure, a gravity center G thereof is located below a level equal to half the height of the exterior case 1. The gravity center G of the fuel cell apparatus 100 refers to the center of mass of the fuel cell apparatus 100, taken as a single mass body, in which all of constituent devices, including the fuel cell module and the auxiliary machines, are housed in the exterior case 1. The barycentric position of the fuel cell apparatus 100 may be determined by a heretofore known gravity center measurement method. For example, in the fuel cell apparatus 100 tilted in a plurality of directions, or suspended in a plurality of positions, a point at which the fuel cell apparatus can be balanced is obtained, and, on the basis of this point, the gravity center can be determined. The gravity center G measurement should be performed in a state where the fuel cell apparatus 100 can be actually operated. The state where the fuel cell apparatus 100 can be actually operated means that, when the fuel cell apparatus 100 includes tanks for storing various media, each tank has been filled with a corresponding medium. For example, where a heat-storage tank 5 to be hereafter described is provided inside the fuel cell apparatus 100, the state where the fuel cell apparatus 100 can be actually operated means a state where the heat-storage tank 5 has been filled with a medium.

The height of the exterior case 1 is equivalent to the distance from the bottom face 1e of the exterior case 1 to the top face 1f thereof, expressed differently, the length of each of sides where the front face 1a and the back face 1b intersect with the left side face 1c and the right side face 1d which are contiguous therewith (the length of the short side of each of the front face 1a and the back face 1b). In what follows, the height of the exterior case 1 will be designated by the symbol h.

In a non-limiting aspect of the present disclosure, the gravity center G of the fuel cell apparatus 100 is located below a level equal to half the height h of the exterior case 1 (h/2). That is, a distance hg from the bottom face 1e to the gravity center G of the fuel cell apparatus 100 is less than h/2 (hg<(h/2)). In downsizing the fuel cell apparatus 100, for example, a reduction in the area of the bottom face 1e leads to a decrease in the moment of resistance, which may cause the fuel cell apparatus 100 to topple down. In this regard, the fuel cell apparatus 100 is configured so that the gravity center G is located below a level equal to half the height h of the exterior case 1 (h/2). In this case, even if the area of the bottom face 1e is reduced for downsizing of the fuel cell apparatus 100 with a consequent decrease in the moment of resistance, the overturning moment of the fuel cell apparatus can be reduced, and stability of installation can be maintained accordingly.

Moreover, as shown in the plan view of FIG. 1C, when the fuel cell apparatus 100 is seen in a plan view, the position of the gravity center G is offset from the center in a width direction of the fuel cell apparatus 100. In the plan view of FIG. 1C, the width direction coincides with any one of a longitudinal width direction, which is the extending direction of a line connecting the left side face 1c and the right side face 1d, viz., a horizontal direction as viewed in the drawing, and a transverse width direction perpendicular to the horizontal direction, viz., a vertical direction as viewed in the drawing. In this exemplification, the position of the gravity center G is offset from the center in the transverse width direction. As employed herein, the language "the position of the gravity center is offset from the center in the transverse width direction" means that, in a non-limiting aspect of the present disclosure, given that the widthwise dimension is divided into three equal portions, then the gravity center is positioned in the range of one of the two end portions other than the central portion.

As seen from the plan view of FIG. 1C, in a non-limiting aspect of the present disclosure, the position of the gravity center G is offset toward the back face 1b with respect to the center. By virtue of the offset of the gravity center G from the center in the width direction, in the event of the fuel cell apparatus being subjected to relatively large shaking movement due to an earthquake, etc., it can be expected that the fuel cell apparatus 100 will tilt or topple in a direction in which the gravity center G is offset, and a toppling-prevention measure can be taken accordingly. Moreover, for transportation of the fuel cell apparatus 100, when using a hand truck on which the fuel cell apparatus 100 needs to be placed in tilted condition, it is advisable that the fuel cell apparatus 100 is conveyed while being tilted in the gravity-center-offsetting direction in a non-limiting aspect of the present disclosure. This makes it possible to transport the tilted fuel cell apparatus with stability, and thereby prevent the fuel cell apparatus from falling from the hand truck, and protect the internally-provided constituent devices against damage caused by the swinging movement of the fuel cell apparatus during transportation. By offsetting the gravity center G toward the front face 1a or the back face 1b which is the pair of largest-area surfaces, it is possible to take a more effective toppling-prevention measure to support the largest surface in view of the case where the fuel cell apparatus 100 is tilted The following describes a fuel cell apparatus 101 according to a modified example in a non-limiting aspect of the present disclosure. As shown in FIG. 2A, the fuel cell apparatus 101 is identical with the fuel cell apparatus 100 shown in FIG. 1 in that a gravity center G' thereof is located below a level equal to half the height of the exterior case 1. In this modified example, as shown in the plan view of FIG. 2C, when the fuel cell apparatus 101 is viewed in plan configuration, the gravity center G' is positioned at the center in a width direction of the fuel cell apparatus 101. In the plan view of FIG. 2C, the width direction coincides with any one of a longitudinal width direction, which is the extending direction of a line connecting the left side face 1c and the right side face 1d, viz., a horizontal direction as viewed in the drawing, and a transverse width direction perpendicular to the horizontal direction, viz., a vertical direction as viewed in the drawing. In this modified example, the gravity center G' may be positioned at the center of the fuel cell apparatus 101 at least in the transverse width direction. In addition, the gravity center G' may be positioned at the center of the fuel cell apparatus 101 also in the longitudinal width direction. As employed herein, the language "the gravity center is located at the center in the width direction" means that, in a non-limiting aspect of the present disclosure, given that the widthwise dimension is divided into three equal portions, then the gravity center is positioned in the range of the central portion.

The positioning of the gravity center G' at the center in the width direction makes it possible to promote the stability of installation, and thereby reduce the likelihood of toppling. With consideration given to the necessity for installation of the fuel cell apparatus under conditions where difficulties are encountered in taking the toppling-prevention measure, as practiced in this modified example, by positioning the gravity center G' at the center in the width direction, an improvement in stability can be achieved.

As shown in FIGS. 3A to 3C, in the fuel cell apparatus 100 according to a non-limiting aspect of the present disclosure, a fuel cell module 2 and a plurality of auxiliary machines housed in the exterior case 1. As employed in this specification, the auxiliary machines refer to devices used directly for supplying a fluid(fuel gas, air, and water) to the fuel cell module 2, such for example as a valve, a flowmeter, a pump, a filter, various tanks, a pipe serving as a fluid passage, etc. In FIGS. 3A to 3C, in the interest of clarity of illustration, only part of the construction is shown, but not all the constituent components is shown in the drawings. Moreover, the arrangement of the constituent components inside the exterior case 1 as shown in FIGS. 3A to 3C is given by way of example, and they may thus be differently arranged as desired as long as the gravity center G, G' is located below a level equal to half the height h of the exterior case 1.

The following describes an example of the arrangement of the constituent components inside the exterior case 1 according to a non-limiting aspect of the present disclosure. In a non-limiting aspect of the present disclosure, within the exterior case 1, a heat dissipator 3 is disposed on the right side face 1d side and on the bottom face 1e side. The fuel cell module 2 is disposed above the heat dissipator 3. Moreover, inside the exterior case 1, there is provided a heat-storage tank 5, located on the left side face 1c side, for receiving therein a heat medium. For example, making adjustment to the arrangement of such auxiliary machines inside the exterior case 1 permits gravity center rearrangement, and more specifically enables the gravity center to be either offset from the center of the fuel cell apparatus in the width direction or positioned at the center of the fuel cell apparatus in the width direction. The following describes an example of the fuel cell module in a non-limiting aspect of the present disclosure.

FIG. 4 is an exploded perspective view showing an example of the fuel cell module. In the fuel cell module 2, a cell stack device 22 is housed inside a housing 21 shaped in a rectangular prism. The cell stack device 22 includes a cell stack 23, and a reformer 25, disposed above the cell stack 23, for reforming a raw fuel and producing a fuel gas which is to be supplied to a fuel cell 24. The cell stack 23 includes an array of upstanding columnar fuel cells 24 of hollow flat type, each having an internal gas channel through which a fuel gas flows from one end to the other end thereof. The fuel cells 24 disposed adjacent each other in the cell-arranging direction are electrically connected in series with each other via an electroconductive member. The lower end of each fuel cell 24 is secured to a manifold 26 by an insulating adhesive. The fuel cell may be built as a columnar cell, and thus, for example, the fuel cell may be given the form of a cylindrical configuration or the form of a horizontal stripe configuration.

The housing 21 includes a box 21a having an open side and a lid 21c which closes an opening 21b of the box 21a. In this non-limiting aspect of the present disclosure, the box 21a is shaped in a rectangular prism having six surfaces, of which one of a pair of largest-area surfaces is opened. The fuel cell module 2 is constructed by inserting the cell stack device 22 into the box 21a through the opening 21b, and thereafter closing the opening 21b with the lid 21c. In the cell stack device 22, with use of externally supplied air as an oxygen-containing gas, a reaction is initiated between the oxygen-containing gas and the fuel gas produced by the reformer 25 to yield electric power. After undergoing the reaction, the gas is burned in the presence of a combustion catalyst, etc., and, the burned gas is discharged, as a high-temperature exhaust gas, out of the fuel cell module 2. The high-temperature exhaust gas from the lid 21c is supplied to a heat exchanger 4.

FIG. 5 is a schematic diagram showing an example of the structure of the fuel cell apparatus shown in FIGS. 1 to 3. The fuel cell apparatus according to a non-limiting aspect of the present disclosure includes a circulation line X, disposed between the heat-storage tank 5 and the heat exchanger 4, through which a heat medium is circulated. The heat exchanger 4 carries out heat exchange between the high-temperature exhaust gas and the heat medium supplied from the heat-storage tank 5, and, the heat medium heated under the heat exchange is returned to the heat-storage tank 5. The heat medium is circulated through the circulation line X between the heat-storage tank 5 and the heat exchanger 4. To achieve a decrease in exhaust gas temperature to a sufficiently low level in the heat exchanger 4, the heat medium from the heat-storage tank 5 is cooled by the earlier described heat dissipator 3 provided in the circulation line X prior to flowing into the heat exchanger 4. After undergoing heat exchange with the heat medium in the heat exchanger 4, the exhaust gas is discharged out of the apparatus through an exhaust outlet 40 formed in the right side face 1d. The moisture contained in the exhaust gas from the fuel cell module 2 becomes condensed water in the heat exchanger 4, and, the condensed water is stored in a condensed water tank 7. The condensed water stored in the condensed water tank 7 is supplied to the reformer 25 to perform steam reforming of a raw fuel.

The heat dissipator 3 includes an inlet 31, disposed at the front face 1a, for introducing external air for cooling purposes, and also includes an exhaust fan 32, disposed at the right side face 1d, for discharging the introduced external air. In a non-limiting aspect of the present disclosure, the heat dissipator 3 is located below the fuel cell module 2.

In a non-limiting aspect of the present disclosure, the heat exchanger 4 is disposed adjacent to the lid 21c of the fuel cell module 2, and is located on the back face 1b side of the fuel cell module 2 within the exterior case 1.

The heat medium heated in return for cooling of the exhaust gas under the heat exchange carried out by the heat exchanger 4 heats tap water supplied from the outside of the apparatus to produce hot water. The hot water discharged is used as domestic water in a bathroom, a kitchen, or a washbasin, for example.

In a non-limiting aspect of the present disclosure, in a heat exchanging device 8 disposed inside or outside the heat-storage tank 5, heat exchange is carried out between tap water and a heat medium, and, the resulting heated tap water is discharged as hot water. In this case, the heat medium may be either water or other medium than water. In the case where the heat medium is water, without the heat exchanging device 8, hot water can be produced by mixing tap water and the water serving as the heat medium in the heat-storage tank 5. In a non-limiting aspect of the present disclosure, a tap water inlet 52 for introducing tap water into the fuel cell apparatus 100 and a hot water outlet 53 for discharging hot water are each disposed at the right side face 1*d* provided with the exhaust fan 32.

Moreover, in a non-limiting aspect of the present disclosure, a position (height hgm) of a gravity center Gm of the fuel cell module 2 in a state of being disposed inside the exterior case 1 of the fuel cell apparatus 100 is located below the level of the gravity center G (or the gravity center G') of the fuel cell apparatus 100 (hg>hgm). The fuel cell module 2 has a relatively large mass compared to other constituent components of the fuel cell apparatus 100. Thus, where the gravity center Gm of the fuel cell module 2 is located below the level of the gravity center G of the fuel cell apparatus 100, the fuel cell apparatus 100 can be installed with increased stability.

The gravity center Gm of the fuel cell module 2 is determined by the following procedure. First, the position of the gravity center of the fuel cell module 2 of its own is measured by the same method as adopted in the measurement of the gravity center G of the fuel cell apparatus 100. On the basis of the measured position of the gravity center, the gravity center Gm of the fuel cell module 2 in a state of being disposed inside the exterior case 1 is determined. For example, when the gravity center of the fuel cell module 2 of its own was found to be located at a level spaced A cm away from the bottom of the housing 21, and the level of the bottom of the housing 21 within the exterior case 1 of the fuel cell apparatus 100 is spaced B cm away from the bottom face 1*e* of the exterior case 1, the height hgm of the gravity center Gm of the fuel cell module 2 within the exterior case 1 is determined to be (A+B) cm.

As described earlier, within the exterior case 1, the heat dissipator 3 is located on the bottom face 1*e* side. In a non-limiting aspect of the present disclosure, the heat dissipator 3 is emplaced on the inner bottom face of the interior of the exterior case 1. Like the fuel cell module 2, the heat dissipator 3 has a relatively large mass, and thus, where the heat dissipator 3 is located on the bottom face 1*e* side, the fuel cell apparatus 100 can be installed with further increased stability. Moreover, when the heat dissipator 3 is located in a lower position, the inlet 31 for introduction of external air is also located in a lower position, and external air having a relatively low temperature can be introduced into the apparatus, and therefore this makes it possible to increase cooling efficiency. Note that the fuel cell apparatus 100 may be installed for use outdoors, and, depending upon the installation site, the fuel cell apparatus 100 may be exposed to direct sunlight. Even in such a case, since the heat dissipator 3 is located in a lower position, a rise in temperature caused by the application of direct sunlight can be prevented, and the cooling efficiency of the heat dissipator 3 can be increased accordingly.

In a non-limiting aspect of the present disclosure, the heat-storage tank 5 is located on the left side face 1*c* side within the exterior case 1, and has a L-shape. A longitudinally-extending upper portion 50 of the L-shaped heat-storage tank 5 is located adjacent to and along the left side face 1*c* of the exterior case 1. Moreover, a transversely-extending lower portion 51 of the L-shaped heat-storage tank 5 extends along the inner bottom face of the interior of the exterior case 1 opposed to the bottom face 1*e* thereof at a location below a level equal to half the height of the exterior case 1. The upper portion 50 is located on an end of the lower portion 51 in the extending direction. Although the lower portion 51 is formed so as to extend along the inner bottom face and so as to extend in the longitudinal width direction in a non-limiting aspect of the present disclosure, this is not to be construed as design limitation. The lower portion 51 may be formed so as to extend along the inner bottom face and so as to extend in the transverse width direction. When a heat medium is received in the heat-storage tank 5 thus configured, the barycentric position of the fuel cell apparatus 100 can be further lowered.

The heat-storage tank 5 may be given any other form than the L-form as long as the heat-storage tank 5 has a portion extending along the inner bottom face of the exterior case 1 at a location below a level equal to half the height of the exterior case 1 as described above. For example, even if the heat-storage tank 5 is composed solely of the lower portion 51 in a tubular form such as a rectangular prism form or cylindrical form, as long as the length of the heat-storage tank 5 in a longitudinal direction or a transverse direction of the bottom face 1*e* is greater than the height of the heat-storage tank 5, the above-described advantageous effects can be attained. The heat-storage tank 5 may also be shaped in a frustum such as a conical frustum or a pyramidal frustum. In another alternative, the heat-storage tank 5 may be given a T-form or inverted T-form in which the upper portion 50 is located on a central part of the lower portion 51 rather than the end thereof, and, the heat-storage tank 5 may be configured so that a bottom surface area thereof is larger than a top surface area thereof. Where the bottom surface area of the heat-storage tank 5 is larger than the top surface area of the heat-storage tank 5, the stability of installation of the heat-storage tank 5 can be improved. The top surface area of the heat-storage tank 5 indicates the area of an upper end face 50*a* of the upper portion 50 of the heat-storage tank 5 as seen in a plan view. The bottom surface area of the heat-storage tank 5 indicates the area of a lower end face of the lower portion 51 of the heat-storage tank 5 as seen in a bottom view.

Although the lower portion 51 of the heat-storage tank 5 is emplaced directly on the inner bottom face of the exterior case 1 in a non-limiting aspect of the present disclosure, a clearance may be left between the lower portion 51 and the inner bottom face, or, an extra member, such as a heat insulating material, may be interposed between the lower portion 51 and the inner bottom face.

In this non-limiting aspect of the disclosure, there is further provided a raw fuel supply line Y connecting a raw fuel supply source and the reformer 25. In a non-limiting aspect of the present disclosure, the raw fuel supply source is a raw fuel supply port 250 disposed at the right side face 1*d* provided with the exhaust outlet 40, the tap water inlet 52, the hot water outlet 53, and the exhaust fan 32. The raw fuel supply line Y includes a fuel pipe 251 through which a raw fuel gas flows from the raw fuel supply port 250 to the reformer 25, and, an electromagnetic valve 252, a flowmeter 253, and a gas pump 254 that are arranged in the fuel pipe 251 successively in the order named in an upstream to downstream direction. The raw fuel supply line Y may further include a desulfurizer for removing sulfur contained in a raw fuel gas. As the auxiliary machines such as the electromagnetic valve 252, the flowmeter 253, and the gas pump 254, it is possible to use heretofore known auxiliary machines applicable to the fuel cell apparatus 100.

In a non-limiting aspect of the present disclosure, in the raw fuel supply line Y, the electromagnetic valve 252, the flowmeter 253, the gas pump 254, and part of the fuel pipe 251 are located above the fuel cell module 2. The constituent components of the raw fuel supply line Y as mentioned just above have a relatively small mass. Thus, disposing such components of relatively small mass above the fuel cell module 2, that is; disposing the components in the upper part of the interior of the exterior case 1 makes it possible to lower the position of the gravity center G (or the gravity center G') of the fuel cell apparatus 100, and thereby install the fuel cell apparatus 100 with increased stability.

Moreover, where the auxiliary machines of the raw fuel supply line Y are located above the fuel cell module 2, with the placement of a gas detector above the fuel cell module 2, even in the event of gas leakage from the raw fuel supply line Y, the gas leakage can be detected efficiently.

In a non-limiting aspect of the present disclosure, inside the exterior case 1, there is provided an external air supply line which introduces air from the outside of the fuel cell apparatus 100 (external air), and supplies the introduced external air serving as an oxygen-containing gas to the fuel cell module 2. The external air supply line includes an air filter 255 which purifies external air by removing suspended particulate matter, etc. contained in the air through adsorption, and an air supply pipe 256 which allows purified air from the air filter 255 to flow to the fuel cell module 2.

In a non-limiting aspect of the present disclosure, the air filter 255 of relatively small mass is disposed above the fuel cell module 2, that is; the air filter 255 is disposed in the upper part of the interior of the exterior case 1. This makes it possible to lower the position of the gravity center G (or the gravity center G') of the fuel cell apparatus 100, and thereby install the fuel cell apparatus 100 with increased stability. After passing through the air filter 255, the filtered external air flows through the air supply pipe 256, passes through the lid 21c of the fuel cell module 2, and is supplied into the fuel cell module 2 for use in power generation. Moreover, part of the external air supply line is located above the fuel cell module 2. In this case, external air introduced into the fuel cell apparatus 100 tends to be exposed to radiation heat from the fuel cell module 2, and thus high-temperature air can be supplied to the fuel cell module 2, with a consequent improvement in power generation efficiency.

Moreover, in a non-limiting aspect of the present disclosure, the fuel cell apparatus 100 further includes a power conditioner 6. The power conditioner 6 serves to supply, in conjunction with a system power source, electric power generated by the fuel cell apparatus 100 to an external load. For example, the power conditioner 6 is configured so that a wiring substrate on which a CPU (Central Processing Unit), a semiconductor memory and other electronic components, etc. are mounted is housed in a protective case 60 shaped in a rectangular prism. Inside the exterior case 1, the power conditioner 6 is disposed above the lower portion 51 of the heat-storage tank 5 and contiguous with the upper portion 50.

The fuel cell apparatus 100 according to a non-limiting aspect of the present disclosure, in addition to the aforestated constituent components, includes a water pump which supplies water from the condensed water tank 7 to the reformer 25, a blower for introducing air which is to be supplied to the fuel cell module 2 and the like, and they may be housed in the exterior case 1. Even in the case where additional auxiliary machines are provided, the gravity center of the fuel cell apparatus 100 including all the constituent devices may be located below a level equal to half the height of the exterior case 1.

The invention has been described in detail, but it is understood that the invention is not limited to the non-limiting aspects of the disclosure as described heretofore, and various changes, modifications, and improvements are possible without departing from the scope of the invention.

REFERENCE SIGNS LIST

1: Exterior case
1a: Front face
1b: Back face
1c: Left side face
1d: Right side face
1e: Bottom face
1f: Top face
2: Fuel cell module
3: Heat dissipator
4: Heat exchanger
5: Heat-storage tank
6: Power conditioner
21: Housing
21a: Box
21b: Opening
21c: Lid
22: Cell stack device
23: Cell stack
24: Fuel cell
25: Reformer
26: Manifold
31: Inlet
32: Exhaust fan
41: Exhaust outlet
50: Upper portion
50a: Upper end face
51: Lower portion
52: Tap water inlet
53: Hot water outlet
60: Protective case
100: Fuel cell apparatus
250: Raw fuel supply port
251: Fuel pipe
252: Solenoid-operated valve
253: Flowmeter
254: Gas pump
255: Air filter
256: Air supply pipe
X: Circulation line

What is claimed is:

1. A fuel cell apparatus, comprising:
a fuel cell module comprising fuel cells housed in a housing;
a plurality of auxiliary machines configured to operate the fuel cell module;
an exterior case, shaped as a rectangular prism, which houses the fuel cell module and the auxiliary machines;
a heat exchanger configured to carry out heat exchange between an exhaust gas from the fuel cell module and a heat medium;
a heat-storage tank configured to store therein the heat medium heated by the heat exchange carried out by the heat exchanger, and
a heat dissipator configured to cool the heat medium flowing through the heat exchanger; wherein the heat dissipator is arranged on a bottom side of the exterior case; wherein the fuel cell module is arranged above the heat dissipator;

wherein a gravity center of the fuel cell apparatus is located below a level equal to half a height of the exterior case, and the heat-storage tank, at least partly, extends along an inner bottom face of the exterior case at a location below the level equal to half the height of the exterior case.

2. The fuel cell apparatus according to claim 1, wherein when the fuel cell apparatus is seen in a plan view thereof,
a position of the gravity center of the fuel cell apparatus is offset from a center in a width direction of the fuel cell apparatus.

3. The fuel cell apparatus according to claim 1, wherein when the fuel cell apparatus is seen in a plan view thereof, the gravity center of the fuel cell apparatus is positioned at a center in a width direction of the fuel cell apparatus.

4. The fuel cell apparatus according to claim 1, wherein a gravity center of the fuel cell module is located below a level of the gravity center of the fuel cell apparatus.

5. The fuel cell apparatus according to claim 1, wherein a bottom surface area of the heat-storage tank is larger than a top surface area of the heat-storage tank.

6. The fuel cell apparatus according to claim 1, further comprising:
a circulation line is configured to circulate the heat medium between the heat-storage tank and the heat exchanger,
wherein the circulation line comprises the heat dissipator.

7. The fuel cell apparatus according to claim 1, wherein at least one of the auxiliary machines is disposed above the fuel cell module.

8. The fuel cell apparatus according to claim 7, wherein the at least one of the auxiliary machines is an air filter configured to purify air which is supplied to the fuel cell module.

9. The fuel cell apparatus according to claim 7, further comprising:
a reformer configured to reform a raw fuel and produce a fuel gas configured to be supplied to the fuel cell; and
a raw fuel supply line connecting a raw fuel supply source and the reformer,
wherein the at least one of the auxiliary machines is an auxiliary machine provided in the raw fuel supply line.

* * * * *